United States Patent
Rotz et al.

[11] 3,802,769
[45] Apr. 9, 1974

[54] METHOD AND APPARATUS FOR UNAIDED STEREO VIEWING

[75] Inventors: Frederick B. Rotz; Albert A. Friesem, both of Ann Arbor, Mich.

[73] Assignee: Harris-Intertype Corporation, Cleveland, Ohio

[22] Filed: Aug. 28, 1972

[21] Appl. No.: 284,051

[52] U.S. Cl. .................................. 352/43, 350/117
[51] Int. Cl. .......................................... G03b 21/32
[58] Field of Search ................ 352/43, 44; 350/117

[56] References Cited
UNITED STATES PATENTS
3,479,111  11/1969  Gabor ................................. 352/44
2,218,875  10/1940  Parsell ................................ 352/43

Primary Examiner—Monroe H. Hayes

[57] ABSTRACT

An unaided stereo viewing system using a hologram as a rear projection screen. The hologram, by having two sets of interference patterns recorded thereon, has the property that, if a stereo pair of transparencies is projected thereon by the conjugates of the two reference beams used to record the interference patterns, light from one image is diffracted into the right eye of an observer and light from the other image is diffracted into the left eye. A plurality of alternating sets of interference patterns provide a plurality of stereo viewing zones.

25 Claims, 9 Drawing Figures

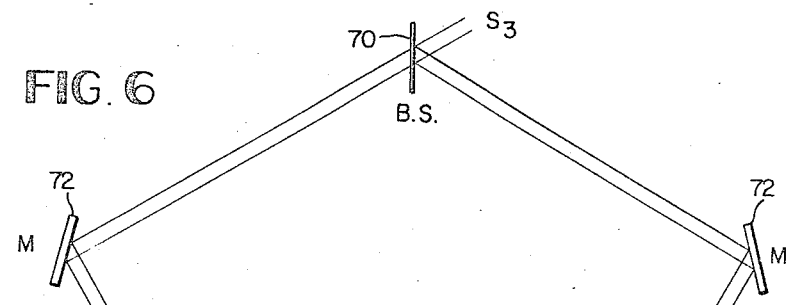
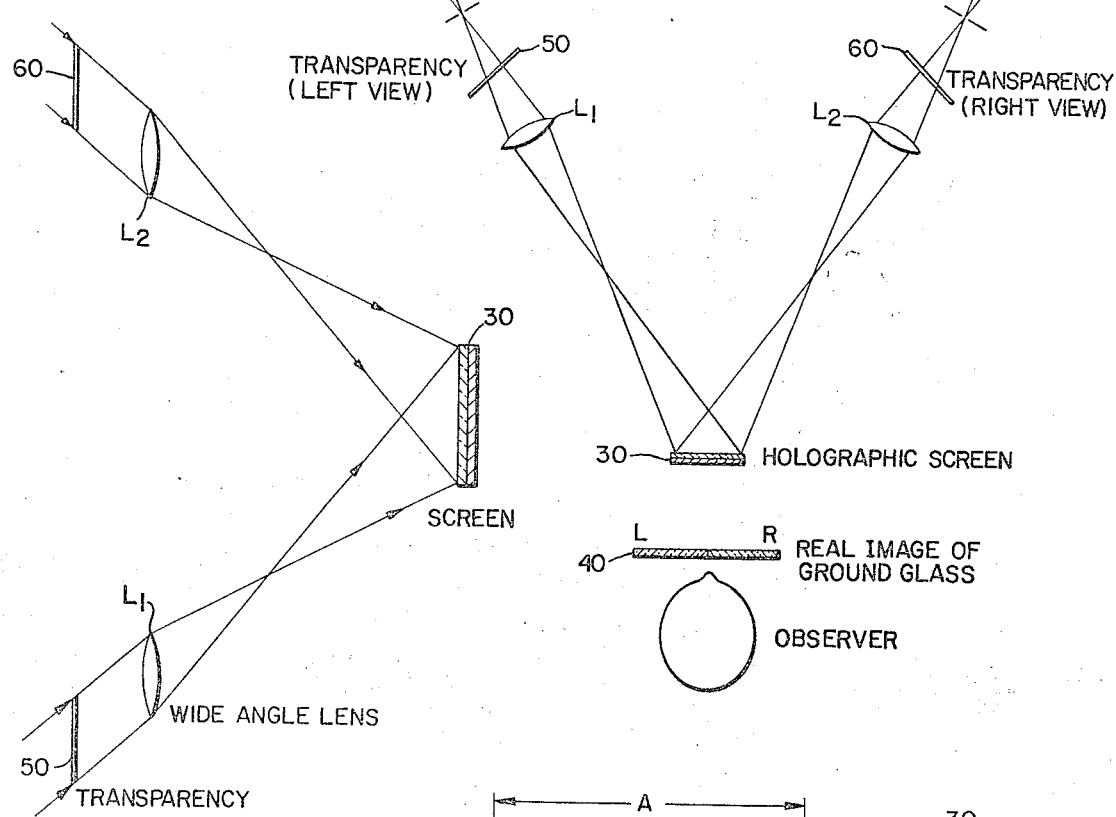
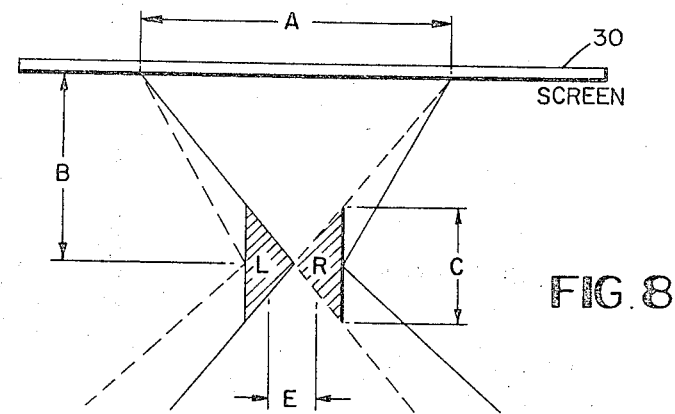

3,802,769

METHOD AND APPARATUS FOR UNAIDED STEREO VIEWING

BACKGROUND OF THE INVENTION

The present invention relates generally to the stereo viewing art and more particularly to an unaided stereo viewer.

DESCRIPTION OF THE PRIOR ART

In the field of stereo or 3-D viewing, the observer was required to use some aid in order to achieve the 3-D or stereo effect. This generally involved projecting a stereo pair of images using two light sources of different color onto a front projection screen. The viewer was required to wear a viewing aid consisting of a pair of glasses with each lens transparent to light from only one of the sources, such that each eye receives only one image of the stereo pair. Similar techniques employing polarized light have also been used.

An early attempt to produce unaided stereo viewing, is described in Stereoscopy by N.A. Valyus, Focal Press, 1966, involves the fabrication of a grating to direct light to independent zones. This effort did not involve the use of holography. More recently, holographically prepared three dimensional view screens have been developed by Dennis Gabor and disclosed in U.S. Pat. No. 3,479,111 issued Nov. 18, 1969. Gabor discloses a theoretical reflection holographic screen of low efficiency. Special recording mediums must be used for his system, which are not yet available, to prevent the problems of shrinkage and distortion.

One of the most critical problems in stereo viewing is development of a system which is relatively simple in use and which requires no auxiliary aids such as anaglyphic glasses.

SUMMARY OF THE INVENTION

The present invention is a technique for displaying stereo images from a rear projection screen so that an observer experiences the usual stereo effect, but is not required to use any auxiliary aids such as anaglyphic glasses or polarizing eyepieces. The rear projection screen is a hologram designed such that when two images are projected simultaneously upon it, the light from each image is diffracted to only one of the eyes of the observer. If one of the images is a right-side view of an object as seen, the observer's right eye will perceive only the right-side view. Similarly his left eye will perceive the left-side view of the other image. Hence, the observer will experience a normal stereoscopic effect.

The holographic screen is fabricated by recording mutually exclusive or incoherent interference patterns using two reference beams individually with a coherent third beam, all projected from the same side of the hologram. The displaying of stereo imagery is achieved by using the conjugates of the two reference beams to simultaneously project corresponding right or left side transparency views on the holographic screen. The two incoherent interference patterns recorded on the hologram will transmit or diffract the corresponding side view to the corresponding eye of the observer. By using a plurality of interference patterns, a plurality of alternating sets of stereo viewing zones can be achieved. The technique described herein is not limited to a specific recording material; any of several readily available holographic recording materials may be used in the fabrication of the screen.

OBJECTS OF THE INVENTION

An object of the invention is to provide stereoscopic viewing without any auxiliary aid.

Another object is to provide a relatively simple means to stereoscopically display a right and left side view.

A further object of the invention is to provide unaided stereo viewing by the use of a specially prepared hologram as a rear viewing screen using available recording material.

Other objects, advantages and novel features of the present invention will become apparent from the following detailed description of the invention when considered in conjunction with the accompanying drawings.

BRIEF DESCRIPTION OF THE DRAWINGS

FIGS. 5 and 6 are schematic diagrams of a method and apparatus for preparing and displaying upon the subject holographic screen, which has a single stereoscopic viewing zone;

FIG. 7 is another embodiment using wide angle projection lenses;

FIG. 8 is a diagram of the stereoscopic depth of field;

FIG. 9 is a diagram of stereoscopic viewing zones with separation zones.

DESCRIPTION OF THE PREFERRED EMBODIMENTS

Figure 1:
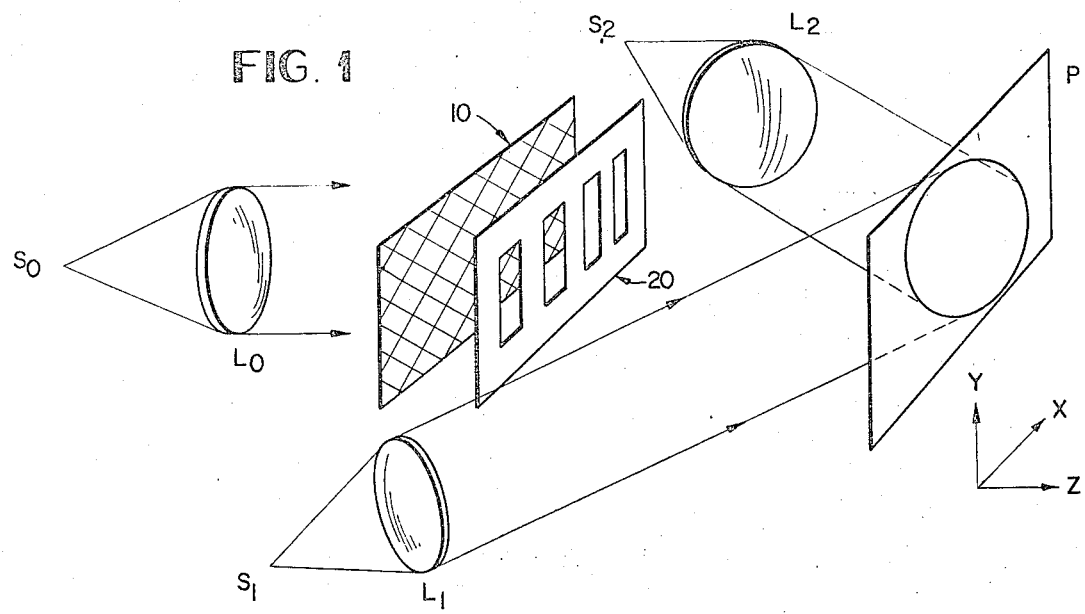
FIGS. 1 and 2 perspectively and schematically show the method and apparatus for preparing the subject holographic screen.
Figure 2:
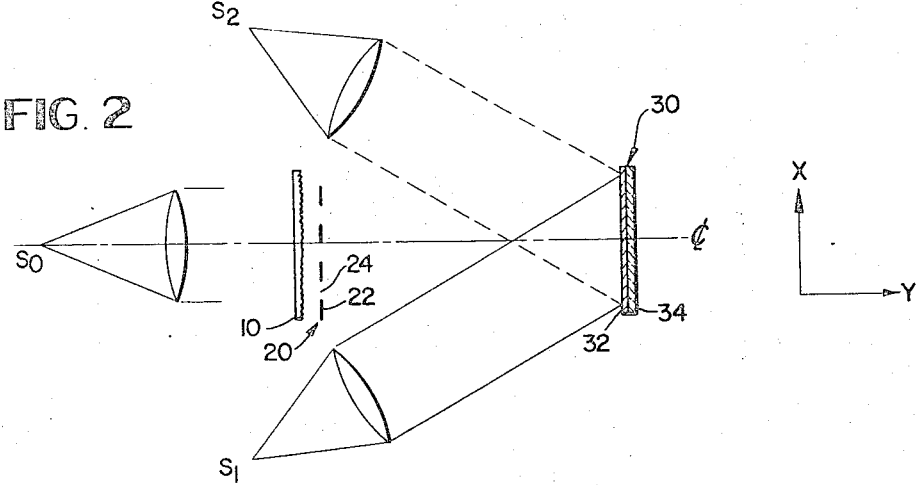

FIGS. 1 and 2 display perspectively and schematically the method and apparatus for the construction of a holographic screen. Three point sources, $S_0$, $S_1$, and $S_2$ are all obtained from the same laser by using mirrors and beam splitters. These sources are collimated by means of lenses $L_0$, $L_1$, and $L_2$, respectively. All three beams overlap in plane P, where a photographic plate is placed. The light from $S_0$ is intercepted by diffuser 10 and aperture mask 20 before it reaches the photographic plate. Every region on the diffuser contributes equal amounts of light to the entire photographic plate. The mask contains a series of narrow apertures, each having a width somewhat less than the separation between a typical observer's eyes. The period of the series of apertures is equal to twice the separation between an observer's eyes, or the apertures are separated by a distance equal to their width. The height of the apertures determines the vertical observation distance, but is otherwise arbitrary.

The holographic viewing screen is made using a double exposure technique. The mask 20, which has apertures 24 and spaces 22, is positioned so that an edge of a center aperture is located at a center line of the system as shown in FIG. 2. This center line is the optical axis of source $S_0$ which is perpendicular to the hologram plate 30. The centerline is also the bisector of the angle formed by the optical axes of sources $S_1$ and $S_2$.

Reference source $S_2$ is blocked and the plate is exposed to light from sources $S_0$ and reference source $S_1$ only from the same side of plate 30. The diffusing plate 10 is left undisturbed while the mask is moved one-half of a period or one aperture width, so that the parts of the diffuser which were previously covered are now open. Reference source $S_1$ is now blocked and the plate is exposed for the second time, but only to the light of sources $S_0$ and reference source $S_2$, also from the same side of plate 30. Hologram 30, which has a recording material (e.g., photographic emulsions) 32 and a substrate portion (e.g., glass) 34, is developed using standard procedures and becomes a holographic viewing screen.

The result of this process is a hologram with two sets of interference patterns which are mutually incoherent. The first set of interference patterns are made with source $S_0$ and reference source $S_1$, and are recorded with the apertures 24 of mask 20 in the first position. The second set are made with source $S_0$ and reference source $S_2$, and are recorded with the apertures 24 in the second position. Thus we have two independent or incoherent holograms recorded on the plate 32.

This holographic screen 30 has the property that, if it is illuminated with a beam corresponding to the $S_1$ reference beam, a virtual image of the diffuser 10 with the mask 20 in its first position will be observed. An illumination beam corresponding to reference beam $S_2$ will reconstruct an image of the mask in its second position. If both illumination beams are used simultaneously, the holographic screen will produce superimposed images of the mask in both positions. Since the sum of the two masks is equivalent to the diffuser alone, simultaneous illumination will give the impression that the mask was not present.

Similarly, conjugate reference beams can be used to produce a real image of the diffuser with the mask in either position. Since the conjugate of a collimated beam is simply a collimated beam traveling in the opposite direction, it is easy to obtain the real image reconstruction; the hologram is simply replaced in its original position but facing the opposite direction. Beam $S_1$ behaves as the conjugate beam and will reconstruct the real image of the diffuser with the mask in the first position. Likewise, $S_2$ will now reconstruct the diffuser and mask in its second position. Beam $S_0$ is, of course, blocked entirely in the reconstruction process.

Figure 3:
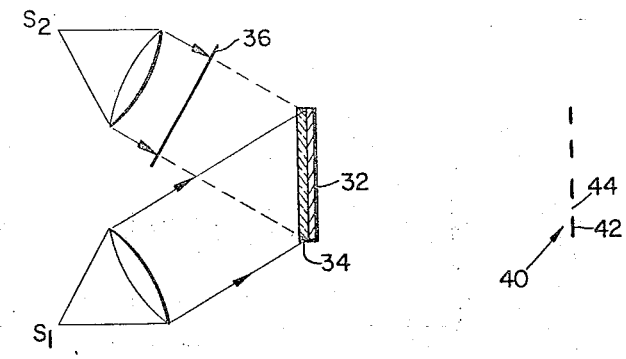
FIG. 3 is a single source projection using the prepared holographic screen.

FIG. 3 shows the reconstruction of the real image of the diffuser and mask by one beam ($S_1$). This image 40 will appear to be a series of bright narrow apertures 44 corresponding to those regions of the diffuser which were not blocked by the mask. This is a result of the recorded interference pattern of $S_0$ and reference $S_1$. An important characteristic of this image is that every region in any one of the bright apertures receives light uniformly from the entire hologram. An observer, whose head is positioned so that one of his eyes (say, the right eye) is located near the center of one of the bright apertures, will see the entire hologram as being uniformly illuminated. The left eye would necessarily be in a region corresponding to a reconstructed opaque portion 42 of the mask and it would receive no light. Similarly, blocking beam $S_1$ and allowing $S_2$ to illuminate the hologram produces the real image of the diffuser with the mask in the other position. An observer, positioned as before, will now receive no light with his right eye but with his left eye he will see the hologram as being uniformly bright. If both beams $S_1$ and $S_2$ illuminate the hologram, both of the observer's eyes will see the hologram as being bright but each eye still receives light diffracted from only one of the beams.

Figure 4:
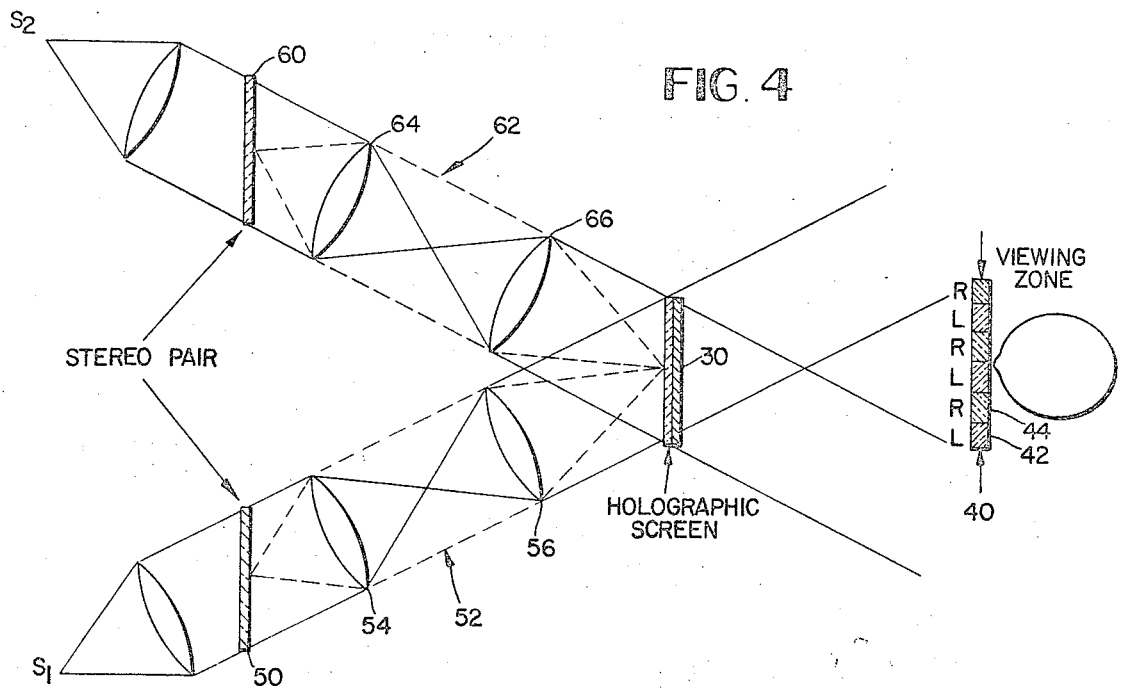
FIG. 4 is a schematic diagram of stereoscopic viewing zones using a pair of stereo transparencies.

A system to obtain unaided stereo viewing using the above described hologram as a rear projection screen is shown in FIG. 4. This system is the same as that shown in FIG. 3, except that unit-power telescopes 62 and 52 have been placed in the collimated beams. These telescopes have lenses 64 and 66 and 54 and 56 respectively. The telescopes are used to image a pair of stereo transparencies 60 and 50 onto the holographic screen 30.

For clarity, let us consider the situation when source $S_1$ is present and source $S_2$ is blocked and let a transparency showing an aerial view of the earth (one-half of a stereo pair) be inserted in the $S_1$ beam so that the transparency is imaged onto the holographic screen. The light impinging on the screen will be diffracted because of the recorded interference patterns so that a real image of the diffuser and mask is formed. Thus the right eye, which is focused on the hologram, will see the image of the transparency as if the hologram were a conventional rear projection screen. To the left eye, however, the holographic screen will appear dark because the hologram does not diffract light into this eye. Similarly, if we block beam $S_1$, insert a transparency in the beam $S_2$, and image this transparency on the hologram, only the left eye will see the image of the transparency while the right eye will see the hologram screen as uniformly dark. If beams $S_1$ and $S_2$ are used simultaneously, each eye will see different images on the hologram screen. If the transparencies are a stereo pair, each eye will see a different view and the observer will perceive a stereo effect. Thus the hologram behaves as a rear projection screen which acts as an unaided stereo system.

It is important to note that while the hologram is reconstructing the diffuser, or the real image of the diffuser, the accuracy of this reconstruction is not particularly important to the performance of the stereo viewing system. Significant distortion in the reconstruction can be tolerated. The sources $S_1$ and $S_2$ used in reconstructing can be relatively broad so long as they do not smear the eye zones so that the eye zones overlap significantly.

Figure 5:
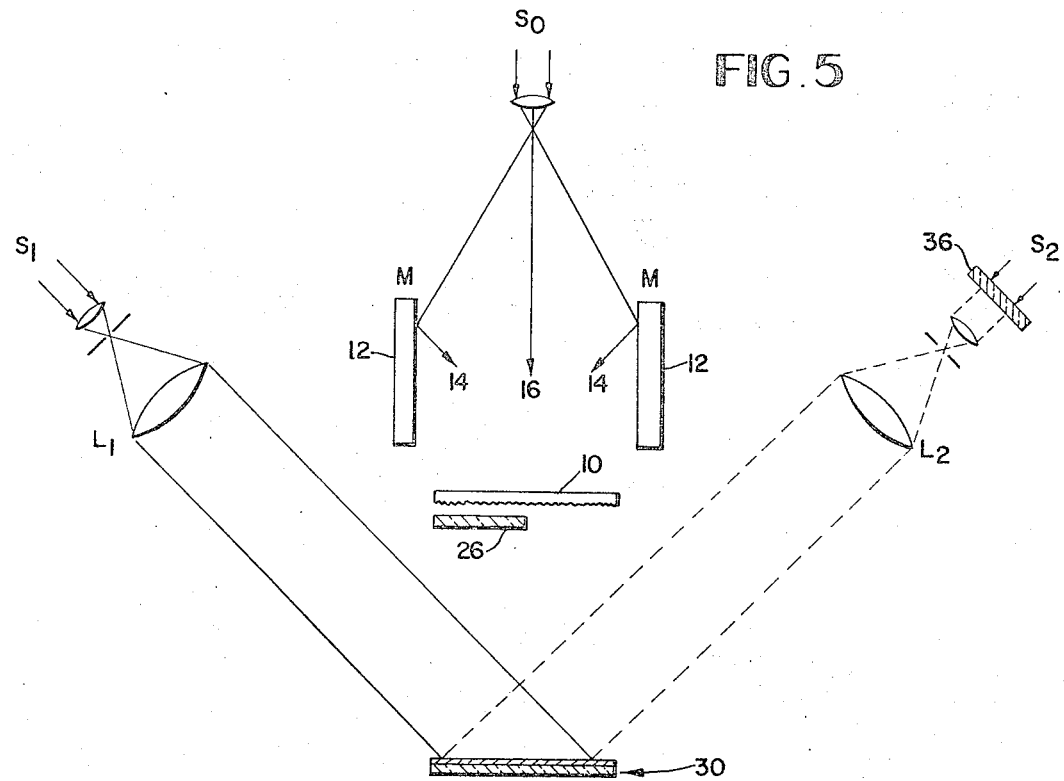

Experimental results were obtained using the holographic screen produced by the technique in FIG. 5 and used in the viewing system shown in FIG. 6. A hologram is made using the system shown in FIG. 5. All three beams are obtained simultaneously from an argon laser. Alternate halves of the diffuser 10 are covered by an opaque block 26 during each of two exposures of the holographic plate 30. The collimated beam opposite the visible half of the glass substrate is used as the reference beam during exposures, the other beam being blocked. The diffuser is illuminated by a diverging beam 16 which covered an area much larger than the diffuser (6 inches across) so that a pair of large mirrors 12 reflected some of this beam back as beam 14 toward the diffuser to produce a more uniform illumination of the holographic plate 30. Exposures of a few seconds are required to produce suitable holograms.

The stereo viewing system is shown in FIG. 6. Two 100mm focal length lenses $L_1$ and $L_2$ are used to image 35mm transparencies 50 and 60 onto the holographic screen 30. The effect of using the diverging illumination beams instead of collimated reference beams causes a magnification of about two in the projected images of the ground glass. When a pair of stereo transparencies are simultaneously imaged onto the hologram, each eye of the observer sees only one of the two superimposed images; the left eye sees the image of the left transparency and the right eye sees the image of the right transparency. Consequently, the observer experiences a stereo effect. The size of the projected images viewed by the observer is about 3 inches × 4 inches.

It is relatively easy for an observer to achieve and maintain the proper position for stereo viewing from the holographic screen. Lateral motion of the observer, in this particular arrangement, is limited to about 62mm because each eye must remain in the proper zone defined by the reconstructed image of the diffuser. Vertical motion of about 12 inches is possible since the diffuser used in making the hologram was fairly long. The distance between the hologram and the observer proved to be non-critical. The observer can move back and forth at least 2 feet and still see a stereo view.

Viewing the holographic screen, it is evident that laser speckle detracts from the appearance of the stereo images. The speckled effect is eliminated by placing a moving ground glass in each illumination beam between the light source and the transparencies. This greatly improves the visual appearance of the display and appears to heighten the stereoscopic effect. Another means or method to reduce the speckled effect is to use a less coherent source of illumination.

The holographic screen must be made with highly coherent, monochromatic light from a laser. In many holographic reconstruction processes monochromatic, coherent light is also required. In this application, however, the light used in the reconstruction process need not be highly coherent or monochromatic because the requirements on the accuracy with which the real image of the aperture mask must be formed are low. In general, it should be possible to achieve adequate performance using conventional (thermal) light sources for illumination of the transparencies in the viewing system. The color of the light should be approximately that used in constructing the holograms but it can have a significant spectral width. It may actually be more convenient, however, to use a laser for the viewing illumination.

The quality of the images observed on the holographic viewing screen is strictly a function of the projection system used to image the stereo pair. The holographic viewing screen merely serves to properly direct the light toward the observer's eyes and in no way degrades the viewed image.

Projection of the stereo pair onto the screen does pose a problem in that the projection beams must strike the hologram at an oblique angle. In principle, a telescopic projection system (as in FIG. 4) could be used resulting in good imaging over the tilted screen; however, such a system would require impractically large optics. A system requiring optics of a reasonable size is shown in FIG. 6. Unfortunately, this arrangement produces images having different magnifications in the two directions across the images (keystone effect) projected onto the viewing screen. One way to avoid the keystone effect is to use wide-angle lenses as shown in FIG. 7. This requires extremely wide-angle lenses. The distortion from the oblique projection can be overcome by using a predistorted stereo transparency. This is achieved by taking normal stereo transparencies and making distorted copies of them such that when these copies are projected upon the holographic screen, their appearance will be of a normal stereo image.

The limitations placed on the position of the observer's head or the stereoscopic depth of field is displayed in FIG. 8. The holographic screen can be created so that the observer may place his head in any one of a number of transverse positions. He may also move towards or away from the screen over a limited range. Actually a fair amount of depth of field in this manner is available. If the observer restricts his attention to a fairly small region of the screen, he will be able to move very close to it. However, if from the same vantage point, the observer looks off to one side or the other of the screen, he will observe an improper stereo effect. Similarly, the further away from the screen he moves, the broader the field of view he may encompass. The depth of field indicated in FIG. 8 is exaggerated and is really half of that illustrated. The depth of field has been found to be:

$$C = 4EB/A$$

where $A$ is the width of the view, $B$ is the distance from the screen, and $E$ is the distance between the observer's eyes.

An alternative to having the right and left eye zones contiguous is to construct the holographic screen such that it forms a small blank zone between each pair of right and left eye zones. This can be done simply by making the center to center spacing of the apertures in the mask greater than twice the width of the openings. A separation between adjacent pairs of right and left eye viewing zones of one eye zone-width is displayed in FIG. 9. The mask, having aperture centers separated by three times the aperture width, is displaced by the width of a single aperture between exposures. Now when the observer moves his head out of the proper position with such a constructed hologram, the stereo effect will be lost. This might be less disturbing to the observer than the sudden inversion of the stereo effect experienced in the contiguous right and left eye zones.

The preferred embodiment disclosed herein is a means for displaying stereo imagery on a rear projection screen without the use of auxiliary aids by an observer. The rear projection screen is a hologram having the property that if a stereo pair is projected onto the screen, light from one image is diffracted into the right eye of the observer and light from the other image is diffracted into the left eye of an observer. It must be noted that the stereo transparencies are merely projected upon the hologram and it serves as a viewing screen. The only purpose of the hologram is to diffract or transmit light in such a manner that the light from each image reaches only one eye.

Precise registration of the stereo image is not required for viewing and its position can be varied so that the scene appears to be behind, at, or in front of the screen. The holographic screen is not used in an imaging mode and does not degrade the quality of the image in any manner, thus any recording material capable of recording the necessary interference patterns may be used in the screen's own structure. The screen allows for multiplicity of observers and, in the event stereo pairs are not available, the image can be viewed in a non-stereo form. The present screen is designed to work with quasi-monochromatic light but an extension of multi-color operation is feasible; coherent illumination is not required for viewing.

What is claimed:

1. A method of fabricating a holographic viewing screen for transmission diffracting use in an unaided stereo viewing system comprising the steps of:

exposing a photographic plate to light from a first reference source;

spatially modulating diffuse light a first time from a third source coherent with said first reference source and on the same side of the plate as said first reference source to provide a light image area and a dark image area;

exposing said plate to light from said third source simultaneously with said step of exposing said plate to light from said first reference source;

exposing said plate to light from a second reference source;

spatially modulating light from said third source a second time to establish diffuse light in an area that was dark in said first spatial modulation of said third source and to eliminate light from an area that was light in the first spatial modulation of said third source, said first source being coherent with said second reference source and on the same side of said plate as said second source; and exposing said plate to the light of said third source, as secondly modulated, simultaneously with said exposure to said second reference source.

2. The method of claim 1 including the further steps of:

positioning said third source so that its optical axis is perpendicular to said plate, and positioning said first and second reference sources so that their optical axes form an angle which is bisected by said third source's optical axis.

3. The method of claim 2 wherein said steps of exposing said plate to said third source are carried out by:

positioning a mask in a first position between said third source and said plate to expose said plate, and repositioning said mask to a second position between said third source and said plate to expose said plate, respectively.

4. The method of claim 3 wherein said mask contains a plurality of apertures spaced from each other by the width of said aperture, and wherein said repositioning step is carried out by moving said mask an aperture width, along a direction line in which the width is measured.

5. The method of claim 3 wherein said mask contains a plurality of apertures spaced from each other by a distance greater than the width of an aperture, and wherein said repositioning step is carried out by moving said mask an aperture width, along a direction line in which the width is measured.

6. A method of fabricating a holographic viewing screen for use in an unaided stereo viewing system comprising the steps of:

splitting a single beam of light to obtain three light sources, positioning the third source so that its optical axis is perpendicular to a photographic plate, positioning the first and second reference sources so that their optical axes form an angle which is bisected by said third source's optical axis, exposing said photographic plate to light from said first reference source, simultaneously exposing said plate to light from said third source coherent with said first reference source, and on the same side of said plate as said first source, said first pair of exposure steps being achieved by simultaneously blocking said second reference source and masking a first portion of said third source, exposing said plate to light from a second reference source, and simultaneously exposing said plate to the light of said third source, coherent with the second reference source and on the same side of said plate as said second source, said second pair of exposure steps being achieved by simultaneously blocking said first reference source and masking a second portion of the third source instead of said first portion thereof.

7. A holographic viewing screen for use in a rear projection unaided stereo viewing system comprising:

a film having recorded thereon:

a first set of interference patterns of a first light beam and a third light beam for diffracting light in a first direction, a second set of interference patterns of a second light beam and said third light beam for diffracting light in a second direction, and wherein said first and second set of interference patterns are mutually incoherent so as to provide two angles of diffraction.

8. An apparatus for producing a holographic viewing screen for transmission diffracting use in an unaided stereo viewing system comprising:

first light means for transmitting a first reference light beam, second light means for transmitting a second reference light beam, third light means for transmitting a diffuse third light beam, light sensitive recording means for recording said three light beams, blocking means for interrupting said recording of said first and second reference light beams individually, said unblocked reference light beam being coherent with said third light beam, and masking means for interrupting the recording of an areal portion of said diffuse third light beam during blocking of said first reference light beam and for interrupting the recording of a different areal portion of said diffuse third light beam during said blocking of said second reference light beam, said three light beams approaching said recording means from the same side.

9. An apparatus for producing a holographic viewing screen for use in an unaided stereo viewing system comprising:

first light means for transmitting a first reference light beam, second light means for transmitting a second reference light beam, third light means for transmitting a third light beam, light sensitive recording means for recording said three light beams, blocking means for interrupting said recording of said first and second reference light beams individually, and masking means for interrupting recording of a portion of said third light beam wherein said three light beams emanate from the same side of said recording means, and wherein:

said third light means has its optical axis perpendicular to said recording means, and said first and second light means' optical axes form an angle which is bisected by said third light means' optical axis.

10. Apparatus of claim 9 wherein said first, second and third light means comprises:

light source means for producing a single beam of light, beam splitter means for splitting said single beam of light into three beams of light, and optic means for directing said light beams' optical axes.

11. Apparatus of claim 9 wherein said masking means includes a mask with a plurality of apertures spaced from each other by the width of said aperture, whereby said masking means interrupts and transmits equal amounts of said third light beam.

12. Apparatus of claim 9 wherein said masking means includes a mask with a plurality of apertures spaced from each other by distances greater than the width of an aperture.

13. A method of projecting an unaided stereo image comprising the steps of:

providing a transmission surface on which two mutually noncoherent superimposed diffraction holograms are recorded, the first of said holograms corresponding to a right eye image and the second corresponding to a left eye image, projecting a right stereo image onto said transmission surface using a first readout beam, projecting a left stereo image onto the same side of said transmission surface using a second readout beam, and transmitting to a viewing station on the other side of said transmission surface a pair of mutually exclusive stereo image projections, each of said projections occupying a different transverse area at said viewing station, whereby the right eye of a viewer at said station sees said right stereo image and his left eye sees said left stereo image, each of said eyes being in a different one of said different transverse areas.

14. A method of claim 13 wherein said transmitting step generates a plurality of pairs of mutually exclusive spaced apart stereo image projections to be viewed by a plurality of viewers.

15. A method of claim 13 wherein said transmission surface comprises a hologram with two sets of interference patterns of a first and a second reference beam individually with a third beam recorded in a mutually incoherent manner.

16. A method of claim 15 wherein said first and second reference beams are the conjugate of said first and second readout beams respectively.

17. An unaided stereo viewer comprising:

projection means for obliquely projecting a pair of stereo scenes, and holographic screen means for receiving said projections on one side of said screen means and for transmitting and diffracting each of said stereo scenes in different directions to reconstruct an image of a first of said scenes in a first region and to reconstruct an image of the second of said scenes in a second region, both of said regions being on the other side of said screen means from said projection means, whereby an observer positioned with one eye in said first region and the other eye in said second region sees only the first of said images in the first eye and only the second of said images in the second eye.

18. A viewer as in claim 17 wherein said screen means comprises a hologram means with two sets of interference patterns recorded in a mutually incoherent manner.

19. A viewer as in claim 18 wherein each of said sets of interference patterns transmits only a corresponding member of said pair of projected stereo images.

20. A viewer as in claim 17 wherein said projection means comprises:

first and second light source means for illuminating the rear of said screen means, and a pair of stereo transparencies positioned singularly between a corresponding first and second light source means and said screen means.

21. A viewer as in claim 20 wherein said screen means comprises:

a hologram means with two sets of interference patterns recorded thereon, each of said sets of interference patterns transmits only a corresponding light source means, and its corresponding transparency image.

22. A viewer as in claim 21 wherein said sets of interference patterns are recorded in a mutually incoherent manner in said hologram means and thus diffract mutually exclusive stereo images to corresponding eyes of an observer.

23. A viewer as in claim 21 wherein said sets of interference patterns comprise a plurality of interference patterns which diffract a plurality of mutually exclusive stereo images to the corresponding eyes of a plurality of observers.

24. A viewer as in claim 23 wherein said stereo images define a plurality of contiguous viewing zones.

25. A viewer as in claim 23 wherein said stereo images define a plurality of spaced viewing zones.

* * * * *